United States Patent [19]
Frisch

[11] 4,362,180
[45] Dec. 7, 1982

[54] POPPET VALVE AND METHOD OF ASSEMBLING SAME

[75] Inventor: Paul P. Frisch, Skokie, Ill.

[73] Assignee: Dayco Corporation, Dayton, Ohio

[21] Appl. No.: 179,859

[22] Filed: Aug. 20, 1980

[51] Int. Cl.³ .................. F16K 25/00; F16K 43/00
[52] U.S. Cl. ......................... 137/15; 137/315; 251/58; 251/85
[58] Field of Search ............ 251/58, 85, 86, 61.4, 251/63.6, 368, 364; 137/1, 15, 315

[56] References Cited

U.S. PATENT DOCUMENTS

| | | | |
|---|---|---|---|
| 2,879,794 | 3/1959 | Costello | 251/85 |
| 2,911,188 | 11/1959 | Anderson | 251/85 |
| 3,089,677 | 5/1963 | Savaria | 251/58 |
| 3,182,951 | 5/1965 | Spencer | 251/85 |
| 3,727,880 | 4/1973 | Stock | 251/85 |

FOREIGN PATENT DOCUMENTS

44-22722 9/1969 Japan ......................... 251/85

*Primary Examiner*—George L. Walton
*Attorney, Agent, or Firm*—Fitch, Even, Tabin, Flannery & Welsh

[57] ABSTRACT

A poppet valve and method of assembling same are provided wherein such valve has an angled fluid flow passage extending through its valve body and has an improved closure for such passage comprising an annular sealing structure fixed to the valve body in sealed relation adjacent the discharge end of the flow passage with the sealing structure having an annular sealing edge at its inner end which is disposed in a plane perpendicular to an axis through such discharge end and a self-centering assembly comprising a disc having a yieldable planar portion which is adapted to engage the sealing edge of the sealing structure and provide a fluid-tight seal.

21 Claims, 5 Drawing Figures

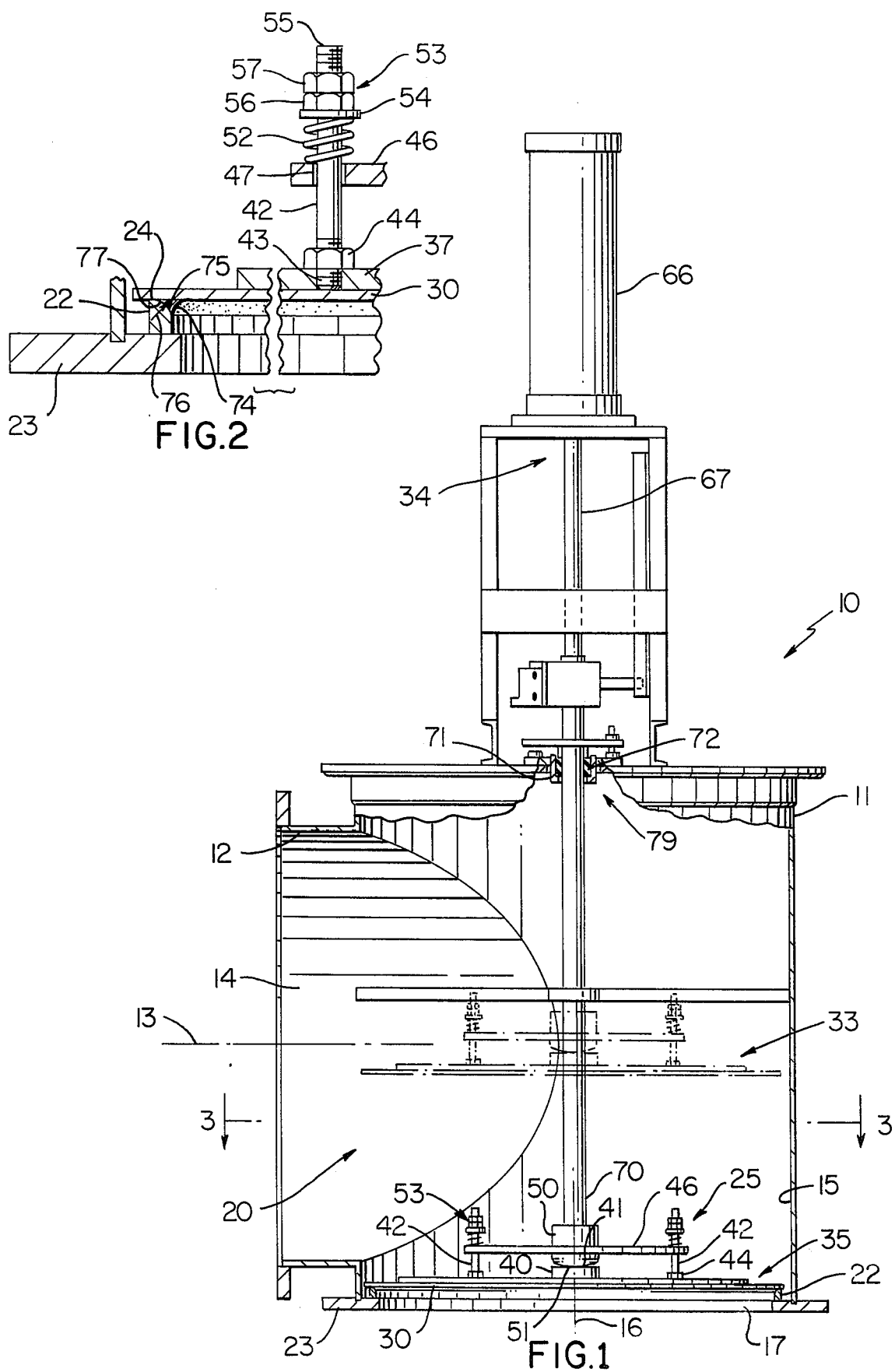

POPPET VALVE AND METHOD OF ASSEMBLING SAME

BACKGROUND OF THE INVENTION

1. Field of the Invention

This invention relates to fluid valves and in particular to a poppet valve and method of assembling same.

2. Prior Art Statement

It is known in the art to provide a poppet valve having an angled flow passage therethrough and having a closure for such passage. However, particularly in large poppet valves each having an angled flow passage which ranges in diameter from several feet to as large as 6 feet, for example, it is particularly difficult to provide a valve having a closure which provides a fluid-tight seal while constructing the valve at reasonable cost and so that it may be easily maintained.

SUMMARY

It is a feature of this invention to provide a poppet valve having a continuous angled fluid flow passage therethrough wherein such valve has an improved closure which is of simple construction yet provides a fluid-tight seal.

Another feature of this invention is to provide a valve of the character mentioned which is economical to manufacture and is constructed for easy field maintenance.

Another feature of this invention is to provide a valve of the character mentioned in which the improved closure means thereof provides the above-mentioned fluid-tight seal for the valve even after an extended service life.

Another feature of this invention is to provide a valve of the character mentioned in which the improved closure means comprises an annular sealing structure fixed to the body of the valve in sealed relation adjacent the discharge end of its outlet passage with the sealing structure having an annular sealing edge at its inner end which is disposed in a plane perpendicular to an axis through the outlet end of the outlet passage and a self-centering closure assembly comprising a disc having a yieldable planar annular portion which is adapted to engage the annular sealing edge of the sealing structure and provide a fluid-tight seal.

Another feature of this invention is to provide a valve of the character mentioned in which the angled passage through the valve body is defined by a first tubular inside surface in the valve body having a first central axis and defining an inlet passage in the valve and a second tubular inside surface in the valve body having a second central axis and defining an outlet passage in the valve with the passages being in fluid flow communication in the central part of the valve and with the axes being disposed at an angle to each other and defining the above-mentioned continuous angled passage through the valve body.

Another feature of this invention is to provide a valve of the character mentioned in which the axes of the inlet and outlet passages are disposed at an angle of 90° to each other whereby the angled passage through the valve extends through the 90° angle.

Another feature of this invention is to provide a valve of the character mentioned in which the self-centering closure assembly is moved by moving means from an open to a closed position thereof while maintaining the assembly in a plane substantially perpendicular to the axes of movement.

Another feature of this invention is to provide a valve of the character mentioned in which the moving means comprises an air-operated actuator which provides reciprocating rectilinear movements.

Another feature of this invention is to provide a valve of the character mentioned which has means holding the self-centering closure assembly against rotation during movements thereof by the air-operated actuator.

Another feature of this invention is to provide a valve of the character mentioned in which the self-centering action of the closure assembly is aided by a plurality of mechanical compression springs and a domed surface acting against a cooperating bearing surface.

Another feature of this invention is to provide a valve of the character mentioned in which the self-centering action of the closure assembly is further aided by the flexibility and resilient character of the disc comprising such assembly thereby assuring the provision of the fluid-tight seal.

Another feature of this invention is to provide an improved method of assembling a poppet valve of the character mentioned.

Therefore, it is an object of this invention to provide an improved poppet valve and method of assembling same having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which:

FIG. 1 is a view with parts in elevation, parts in cross section, and parts broken away particularly illustrating one exemplary embodiment of the poppet valve of this invention which has improved closure means comprising an annular sealing structure and a self-centering closure assembly;

FIG. 2 is an enlarged view taken with parts in cross section, parts in elevation, and parts broken away particularly illustrating a fragmentary portion at one side of the body of the valve of a modification of the improved closure means;

DETAILED DESCRIPTION

Figure 3:
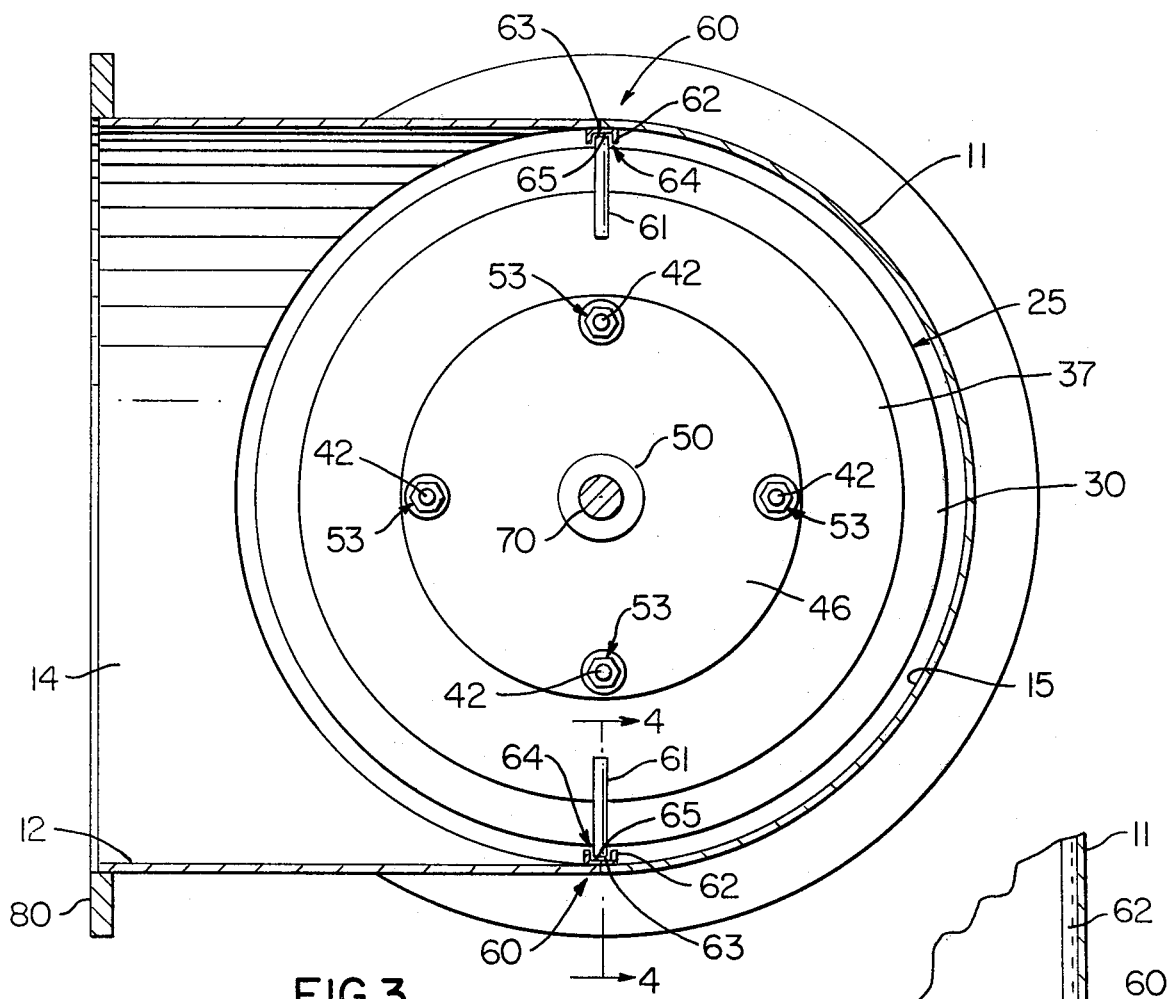
FIG. 3 is a view taken essentially on the line 3—3 of FIG. 1 and drawn to an enlarged scale.

Reference is now made to FIG. 1 of the drawings which illustrates one exemplary embodiment of a poppet valve construction or poppet valve, and method of assembling same, of this invention wherein such poppet valve is designated generally by the reference numeral 10. The poppet valve 10 is of a simple and economical construction and may be used in applications requiring fluid flow passages ranging from several inches to several feet in diameter, with the larger diameter being as large as 6 feet, or more, in some applications.

The poppet valve 10 comprises a valve body 11 which may be of any suitable construction whereby such body may be fabricated using sheet metal, cast employing a suitable metal, or made using any other technique known in the art. The valve body 11 has a first tubular inside surface 12 which has a first central axis 13 defining an inlet passage 14 in the valve body. The valve body also has a second tubular inside surface 15 which has a second central axis 16 and with the inside surface 15 defining an outlet passage 17 in the valve body. The passages 14 and 17 are in fluid flow communication in the central part of the valve body or valve with the axes 13 and 16 disposed transverse each other and thereby defining what will be referred to as a continuous angled passage 20 through the valve body 11. This reference to angled passage 20 is intended to define the fact that passages 14 and 17 flow smoothly together at the discharge and inlet ends thereof respectively and are disposed at an angle to each other. In this example of the invention, the central axes 13 and 16 of the passages 14 and 17 respectively are disposed at an angle of 90° to each other whereby the inlet passages 14 and 17 cooperate to define the continuous angled passage 20 through the valve body 11 which is an angled passage of 90°.

Figure 5:
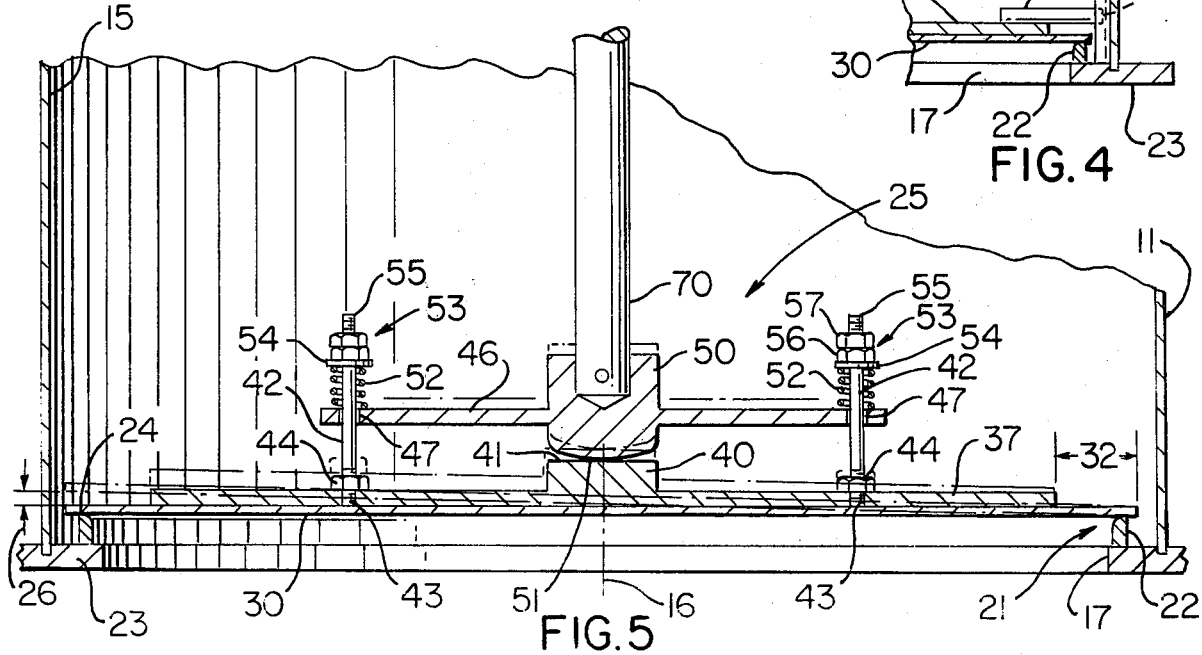
FIG. 5 is an enlarged fragmentary view particularly illustrating the manner in which a self-centering closure assembly of the valve moves into a fluid-tight sealed relation even under conditions where the closure assembly approaches an annular sealing structure in a skewed manner.

The valve 10 has improved closure means, which will be designated generally by the reference numeral 21 and such closure means is provided as an integral part of the valve (FIG. 5). The closure means 21 assures that, regardless of the size of the poppet valve 10, and in particular the size of the continuous angled passage 20 therethrough, a fluid-tight seal is provided for such passage.

Referring now to FIG. 5 of the drawings, it is seen that the closure means 21 comprises an annular sealing structure 22 which is fixed to the valve body 11 in sealed relation adjacent the discharge end of the outlet passage 17. The annular sealing structure 22 of this example is fixed, by welding, to an annular flange 23 defining the outlet of the outlet passage 17; and, the flange 23 is suitably fixed, as by welding, to the valve body 11. The annular sealing structure 22 has an annular sealing edge 24 at its inner end which is disposed in a plane perpendicular to the axis 16.

The closure means 21 also comprises a self-centering closure assembly 25 which is made in accordance with the teachings of this invention. The self-centering assembly 25 operates such that even under conditions where the assembly approaches the annular sealing structure, and in particular the sealing edge 24 of the annular sealing structure 22 in a skewed manner (shown as a skew angle 26 shown in FIG. 5) the assembly 25 self centers and still provides a fluid-tight seal between such assembly 25 and the annular sealing edge 24.

The assembly 25 comprises a disc 30 which is preferably made of a high-strength resilient material such as stainless steel, or the like, and such disc has a comparatively small thickness which may be generally of the order of a small fraction of an inch, depending upon the overall diameter of the disc 30. The disc 30 has a yieldable, yet highly resilient, planar annular portion 32, which is best illustrated in FIG. 5, and the portion 32 is particularly adapted to engage the annular sealing edge 24. The yielding character of portion 32 cooperating with the self-centering feature of the assembly 25 assures the provision of the fluid-tight seal. Yieldable portion 32 is highly resilient, as mentioned, and a typical disc 30, with its portion 32, is made of stainless steel.

The valve 10 is an open-closed 2 position valve with the fully open position being shown by dotted lines at 33 in FIG. 1 and the fully closed position being shown by solid lines at 35. In the fully closed position the planar annular portion 32 of the assembly 25 engages the annular sealing edge 24 of the sealing structure 22. The assembly 25 is moved from its fully open to its fully closed position by suitable moving which is designated generally by the reference numeral 34. The moving means 34 provides rectilinear reciprocating movements along a single axis which coincides with the axis 16 while maintaining the assembly 25 substantially perpendicular to such axis at all positions thereof.

Referring again to FIG. 5, it is seen that the self-centering assembly 25 comprises the comparatively thin disc 30, as previously mentioned, and such disc is a circular disc. The assembly 25 also comprises a back-up plate 37 of circular peripheral outline which is fixed against the disc 30 and the back-up plate has a diameter which is smaller than the diameter of the disc 30, thereby defining the annular portion 32 radially outwardly of the plate 37.

The assembly 25 also comprises a bearing member 40 provided at the center of the back-up plate 37; and, in this example of the invention the bearing member 40 is defined as an integral projection extending upwardly from the back-up plate and having a planar bearing surface 41. The purpose of the bearing member 40 will be described subsequently.

The assembly 25 of the poppet valve 10 also has a plurality of spring support means, each designated generally by the reference numeral 42, fixed to the back-up plate 37 on a common circumference, as illustrated in FIG. 3. The spring support means in this example is defined by a plurality of bolts 42 having threaded inner ends 43 fixed (by threadedly fastening same) to the back-up plate 37. Once a threaded end 43 is threaded in position, a threaded nut 44 is threaded along such end and against the back-up plate and serves as a lock nut for its bolt 42.

The assembly 25 also comprises what will be referred to as a spring plate 46 which has a plurality of openings 47 therein which receive the spring support members or bolts 42 therethrough. The spring plate 46 has a pivot member 50 at the central portion of such plate and in this example the pivot member 50 is a hub-like member defined as an integral part of the plate 46. The pivot member 50 has a downwardly convex or domed surface 51 which engages the bearing member 40 and in particular planar surface 41 of such bearing member.

The assembly 25 also comprises spring means shown as a plurality of compression springs 52 each cooperating with an associated support member or bolt 42. Each compression spring 52 is disposed substantially concentrically around an associated bolt 42 and the assembly 25 also has means 53 holding each spring 52 between its bolt and spring plate 46 so that each spring 52 yielding urges the domed surface 51 of the pivot member 50 against the planar bearing surface 41 of the bearing member 40. The springs 52 and domed surface 51 assure that the yieldable planar annular portion 32 of the disc 30 firmly engages the annular sealing edge 24 of the sealing structure 22 to provide a fluid-tight seal, even under conditions where the annular portion 32 approaches the annular sealing edge 24 in a skewed manner, such as at the skew angle 26 previously described. The domed surface 51 serves as a pivot.

The assembly 25 has means 53 holding each spring 52 in compression between its support member and spring plate 46 as mentioned earlier. Each holding means 53 comprises a washer 54 which is loosely disposed around a threaded outer end 55 of its threaded bolt 42 and a nut 56 which is threaded along the threaded outer end 55 and engages the washer 54 and urges same against its spring 52 compressing same. A second threaded nut 56 is provided and threaded against an associated nut 55 and serves as a lock nut for each holding means 53.

The springs 52 of this example are illustrated and described as mechanical compression springs; however, it will be appreciated that such springs may be of any suitable type known in the art including, mechanical, hydraulic, pneumatic, and combinations of these types.

Figure 4:
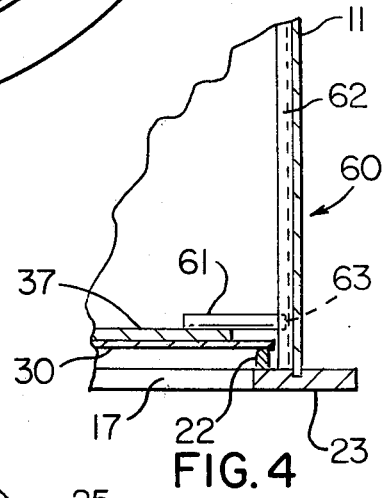
FIG. 4 is a view taken essentially on the line 4—4 of FIG. 3.

The valve 10 also has guide means 60 for guiding or holding the assembly 25 against rotation during movement thereof by the moving means 34. The guide means 60 is best illustrated in FIGS. 3 and 4 of the drawings and comprises a pair of guide pins 61 each suitably fixed to the backup plate 37 as by welding, or the like, at diametrically opposed positions on such plate. The guide means 60 also comprises a pair of channel members, each designated generally by the reference numeral 62, fixed to the valve body 11 at diametrically opposed positions corresponding to the positions of the pins 61 on the plate 37. The channel members 62 receive the outer ends 63 of the guide pins 61 therein.

Each guide pin 61 is a substantially right circular cylindrical pin and each channel member 62 has a substantially U-shaped cross-sectional configuration which is adapted to receive an end portion 63 of an associated pin 61 therewithin. Each end portion 63 is received within its channel with a substantial clearance 64 between the end portion and the inside surface 65 of the channel to assure unobstructed movement of each end portion along its channel member.

As previously mentioned, the valve 10 has moving means 34 for its assembly 25. The moving means 34 of this example (FIGS. 1 and 5) comprises an air operated actuator 66 of known construction. The actuator 66 has an actuating rod 67 extending therefrom and the rod has a terminal outer end 70 suitably fixed to the assembly 25 and in particular to the integral pivot member 50 provided at the central portion of the spring plate 46 of the assembly 25. The actuator 66 serves to move the rod 67 and hence the entire assembly 25 between the solid-line closed position thereof illustrated at 35 in FIG. 1 and the dotted line open position thereof shown at 33, in a reciprocating manner.

The valve 10 also has a seal structure 79 between the valve body 11 and the actuating rod 67, and as shown in FIG. 1. The seal structure 79 comprises a support housing 71 carried by the valve body 11 and an annular polymeric sealing member 72 supported within the housing 71. The sealing member 72 receives the rod 67 therethrough and maintains a fluid-tight seal between the rod 67 and valve body 11 under all operating conditions of the valve.

A modification of the poppet valve 10 of this invention is illustrated in FIG. 2 of the drawings and such modification also employs an annular polymeric seal 74 as added assurance that the closure means 21 will provide a fluid-tight seal. The polymeric seal is preferably in the form of a yieldable yet resilient synthetic plastic material which is suitably bonded to the planar annular portion 32 of the disc 30. The annular polymeric seal 74 is particularly adapted to engage a portion of the sealing structure 22 adjacent the annular sealing edge 24 of such structure with the polymeric seal 74 cooperating with the sealing edge 24 to provide the added assurance for a fluid-tight seal.

The annular structure 22 is a tubular structure which is suitably fixed to the flange 23 as previously described. The structure 22, when viewed in cross section, may have an arcuate inner surface 75 which when viewed in cross section is defined on a radius 76, as illustrated in FIGS. 2 and 5, so as to define the sealing edge 24 of comparatively narrow dimension, which approaches a line contact in some applications.

In the case of the modified valve 10 of FIG. 2, the seal 74 is preferably defined or formed in position after moving the valve closure assembly 25 into its closed position with the planar annular portion 32 in contact against the edge 24. The valve 10 is preferably disposed with its outlet facing upwardly and with the disc 30 in a substantially horizontal plane. The annular polymeric seal is then precisely formed in position whereby an arcuate surface 77 is defined as a part of the seal 74 which interfaces and is nested against surface 74.

The poppet valve 10 has a flange 23 as previously described defining the outlet of the outlet passage 17; and a similar flange is provided to define the inlet of the inlet passage and such inlet flange is designated by the reference numeral 80 in FIG. 3. Each flange 23 and 80 may be provided with suitable means to enable fastening thereof and hence the valve 10 in its operating environment. Each flange 23 and 80 may be provided with suitable spaced openings therein (not shown) to enable fluid-tight fastening with other components associated therewith.

The valve 10, including the modification thereof of FIG. 2, may be used in numerous applications and sized as required. Further, such valve may be designed to operate at temperatures ranging between $-65°$ F. and $400°$ F. In each instance, the materials selected to make the valve may be varied depending upon the required valve performance.

A poppet valve 10 made in accordance with the teachings of this invention has been proposed for use with printing machines to control flow of air containing an ink solvent into a large tank which has the suitable means within the tank for removing the solvent from the air. In this proposed application, a valve having an angled fluid flow passage 40 inches in diameter has been proposed.

The valve 10 may be provided with means indicating whether such valve is in its open or closed position; and, such means may be of any suitable type known in the art.

While present exemplary embodiments of this invention, and methods of practicing the same, have been illustrated and described, it will be recognized that this invention may be otherwise variously embodied and practiced within the scope of the following claims.

What is claimed is:

1. In a poppet valve including a valve body defining an internal chamber and having inlet and outlet passages communicating with said chamber, and closure means disposed within said chamber and adapted to close a selected one of said inlet and outlet passages; the improvement wherein said closure means comprises, in combination, means defining an annular sealing edge circumferentially of said selected one of said inlet and outlet passages so that said sealing edge lies in a plane substantially perpendicular to the axis of said selected passage, a valve disc having an annular portion adapted to engage said annular sealing edge in fluid-tight sealing relation therewith, a backup plate fixed generally concentrically to said disc and defining a bearing surface generally centrally thereon, a spring plate defining a domed surface thereon, means supporting said spring plate internally of said chamber so as to lie in a plane substantially perpendicular to said axis of said selected passage in generally coaxial relation with said backup plate, and means cooperative with said backup plate and said spring plate for biasing them toward each other so that said domed surface engages said bearing surface in a manner to enable relative movement between said backup plate and said spring plate while maintaining relatively fixed rotational relation therebetween, said spring plate support means including means operative to move said backup plate and spring plate between a first position wherein said valve disc is spaced from said sealing edge to enable flow through said selected passage and a second position wherein said annular portion of said valve disc engages said sealing edge in fluid-tight sealing relation therewith.

2. A poppet valve as defined in claim 1 wherein said inlet and outlet passages define central axes which are disposed at 90° to each other, said internal chamber being defined by a continuous angled passage extending through an angle of approximately 90°.

3. A poppet valve as defined in claim 1 including guide means for guiding and holding said valve disc against rotation during movement thereof between said first and second positions.

4. A poppet valve as set forth in claim 3 in which said guide means comprises, a pair of guide pins fixed to said backup plate at diametrically opposed positions, and a pair of channel members fixed to said valve body at corresponding diametrically opposed positions, said channel members being adapted to receive said guide pins therein.

5. A poppet valve as set forth in claim 4 in which each of said guide pins is a substantially right circular cylindrical pin and each of said channels has a substantially U-shaped cross-sectional configuration which is adapted to receive an end portion of an associated pin therewithin, each end portion being received within its channel with substantial clearance between the end portion and the inside surface of the channel to assure unobstructed movement of each end portion along its channel.

6. A poppet valve as defined in claim 1 wherein said valve disc comprises a comparitively thin flat circular disc, said backup plate having a substantially circular peripheral outline fixed concentrically against said disc, said backup plate having a diameter less than the diameter of said disc so as to define said annular portion of said valve disc radially outwardly of said backup plate.

7. A poppet valve as defined in claim 6 wherein said annular portion of said disc radially outwardly of said backup plate comprises a yieldable substantially planar annular portion of said disc.

8. A poppet valve as defined in claim 1 wherein said means operative to move said backup plate comprises an actuator having an actuating rod extending therefrom, said rod having a terminal outer end fastened to said backup plate.

9. A poppet valve as set forth in claim 8 in which said actuator comprises an air operated actuator.

10. A poppet valve as set forth in claim 9 and further comprising a seal structure supported by said valve body and being adapted to receive said actuating rod therethrough for sliding rectilinear reciprocating movements while maintaining a tight seal in said valve body.

11. A poppet valve as set forth in claim 10 and further comprising an annular polymeric seal bonded to said planar annular portion, said polymeric seal being adapted to engage a portion of said sealing structure adjacent said annular sealing edge, and said polymeric seal cooperating with said sealing edge to assure provision of said fluid-tight seal.

12. A poppet valve as defined in claim 1 wherein said means cooperative with said backup plate and said spring plate for biasing them toward each other includes a plurality of spring support members fixed to said backup plate on a common circumference radially outwardly of said bearing surface, said spring plate having a plurality of openings therethrough each of which is adapted to receive a corresponding one of said spring support members therethrough, a spring cooperatively associated with each of said support members so that said springs yieldingly urge said domed surface against said bearing surface and facilitate fluid tight engagement of said annular portion of said valve disc against said sealing edge under conditions where said annular portion of said disc initially approaches said annular sealing edge in a skewed manner.

13. A poppet valve as set forth in claim 12 in which said plurality of spring support members comprises a plurality of bolts having inner ends fixed to said backup plate and having threaded outer ends which extend through said openings in said spring plate, said plurality of springs consist of a plurality of mechanical compression springs each disposed around an associated bolt, and including means holding each spring in compression comprising at least a threaded nut threadedly engaging the threaded outer end of an associated bolt and serving to compress an associated spring between the nut and said spring plate.

14. A poppet valve as set forth in claim 13 in which said plurality of bolts consist of a plurality of four bolts each having an associated compression spring, associated therewith, said bolts and springs being disposed 90° apart on said common circumference, and said disc is a metal disc.

15. A poppet valve comprising, in combination, a valve body defining an internal chamber and having inlet and outlet passages communicating with said chamber, at least one of said inlet and outlet passages having an annular sealing edge disposed circumferentially thereof with said sealing edge disposed in a plane substantially perpendicular to the axis of said at least one of said passages, a valve disc having a yieldable substantially planar annular sealing edge adapted for fluid-tight engagement with said sealing edge, a backup plate fixed generally concentrically to said valve disc and sized so as not to engage said annular yieldable portion of said valve disc, a plurality of spring support members fixed to said backup plate on a common circumference, a generally planar spring plate, means supporting said spring plate internally of said chamber so as to lie in a plane substantially perpendicular to said axis of said at least one passage in generally coaxially relation with said backup plate, said spring plate having a plurality of openings therein each of which receives a corresponding one of said spring support members therethrough, a spring cooperative with each of said support members in a manner to urge said backup plate toward said spring plate, said spring plate support means including means enabling movement of said backup plate and spring plate between a first position spaced from said sealing edge to enable flow through said one of said passages and a second position wherein said annular portion of said disc engages said sealing edge in fluid-tight relation therewith, and mutually cooperable surface means interposed between said spring plate and said backup plate to enable relative movement therebetween so that said yieldable annular portion of said valve disc engages the full circumference of said annular sealing edge in the event that said annular portion of said valve disc approaches said annular sealing edge in a skewed manner.

16. A method of assembling a poppet valve which includes a valve body defining an internal chamber and having inlet and outlet passages communicating with said chamber, said method comprising the steps of inserting means within said chamber to define an annular sealing edge circumferentially of a selected one of said inlet and outlet passages so that said sealing edge lies in a plane substantially perpendicular to the axis of said selected passage, fixing a backup plate generally concentrically to a valve disc so as to establish an annular sealing edge on said disc of a size sufficient to engage said annular sealing edge, said backup plate defining a bearing surface generally centrally thereon, interconnecting said backup plate to a spring plate, said spring plate defining a domed surface thereon and being interconnected to said backup plate in a manner to bias said domed surface against said bearing surface and enable relative movement between said backup plate and said spring plate while maintaining relatively fixed rotational relation therebetween, and mounting said valve disc, backup plate and interconnected spring plate within said chamber so that said spring plate is movable between a first position wherein said valve disc is spaced from said sealing edge to enable flow through said selected passage and a second position wherein said annular portion of said valve disc engages said sealing edge in fluid-tight sealing relation therewith.

17. A method as defined in claim 16 wherein the last mentioned step includes attaching moving means to said spring plate so as to enable said movement of said valve disc while maintaining said spring plate substantially perpendicular to the axis of said selected passage at all positions of said valve disc.

18. A method as set forth in claim 17 and comprising the further step of guiding and holding said valve disc against rotation during movement thereof with said moving means.

19. A method as set forth in claim 16 wherein said last mentioned step comprises supporting an actuator on said valve body so that an actuating rod on said actuator extends into said chamber, and attaching a terminal end of said rod to said spring plate.

20. A method as set forth in claim 16 including the step of bonding an annular polymeric seal against said annular portion of said valve disc, said polymeric seal being adapted to engage said annular sealing edge and cooperate therewith to assure provision of said fluid-tight seal.

21. A method as set forth in claim 20 in which said bonding step comprises the step of simultaneously forming the configuration of said polymeric seal during bonding.

* * * * *